Sept. 21, 1954      J. M. HOFF      2,689,422
ILLUMINATED DISPLAY
Filed Jan. 27, 1951      3 Sheets-Sheet 1
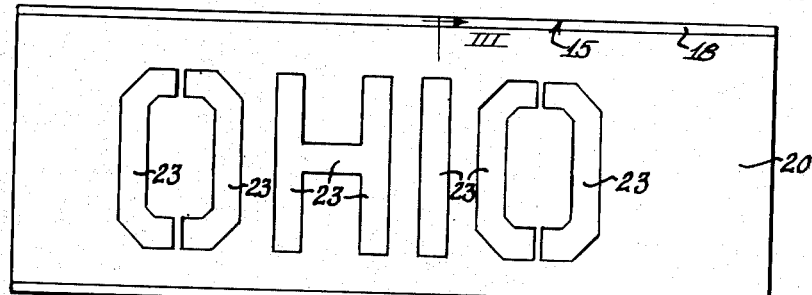
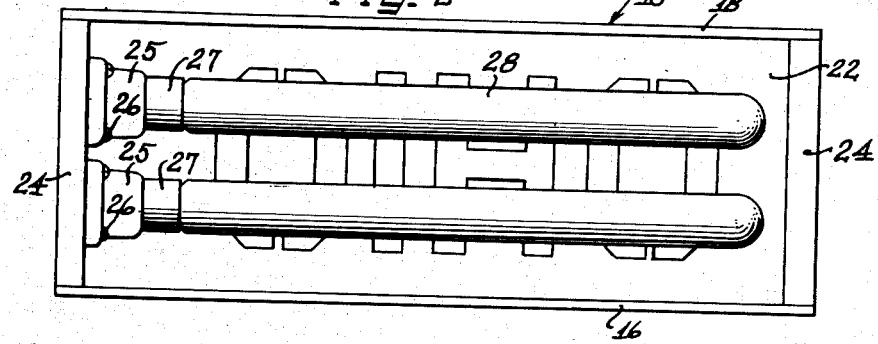
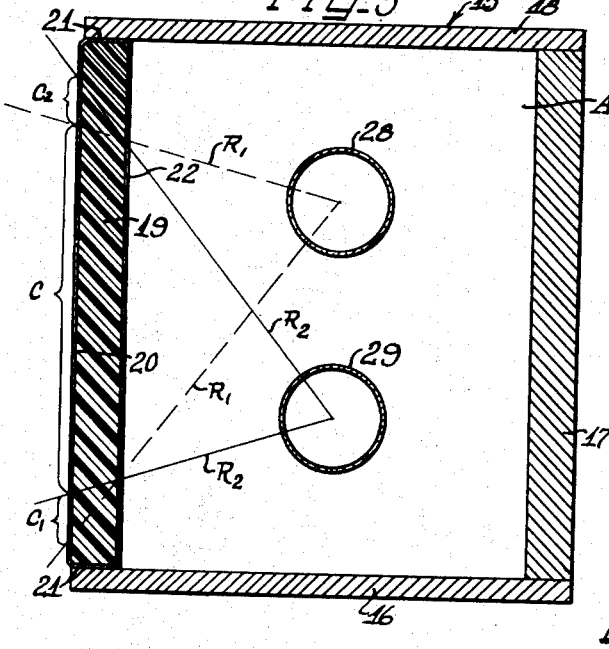
Inventor
Jean M. Hoff

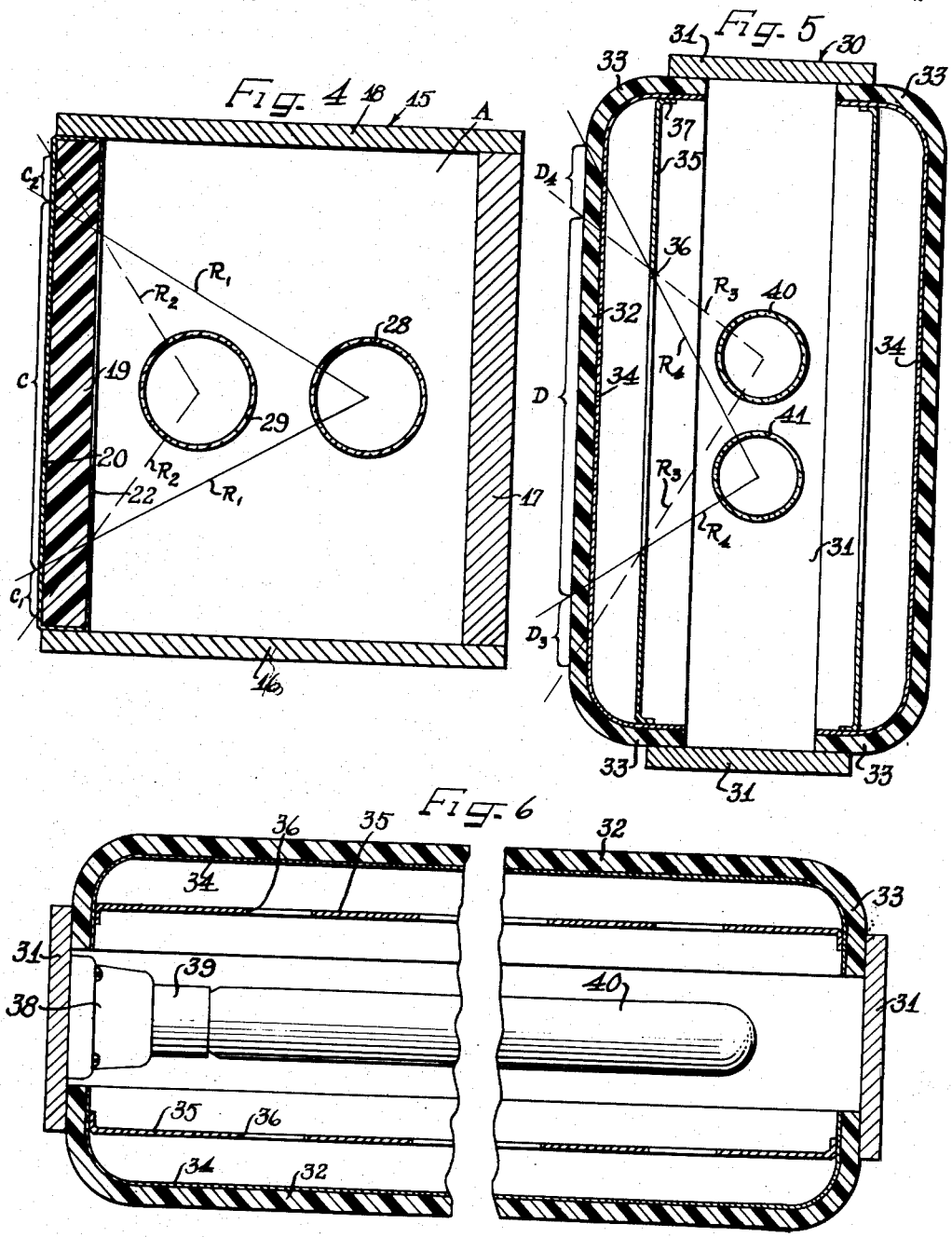

Sept. 21, 1954          J. M. HOFF          2,689,422
ILLUMINATED DISPLAY
Filed Jan. 27, 1951                         3 Sheets-Sheet 3
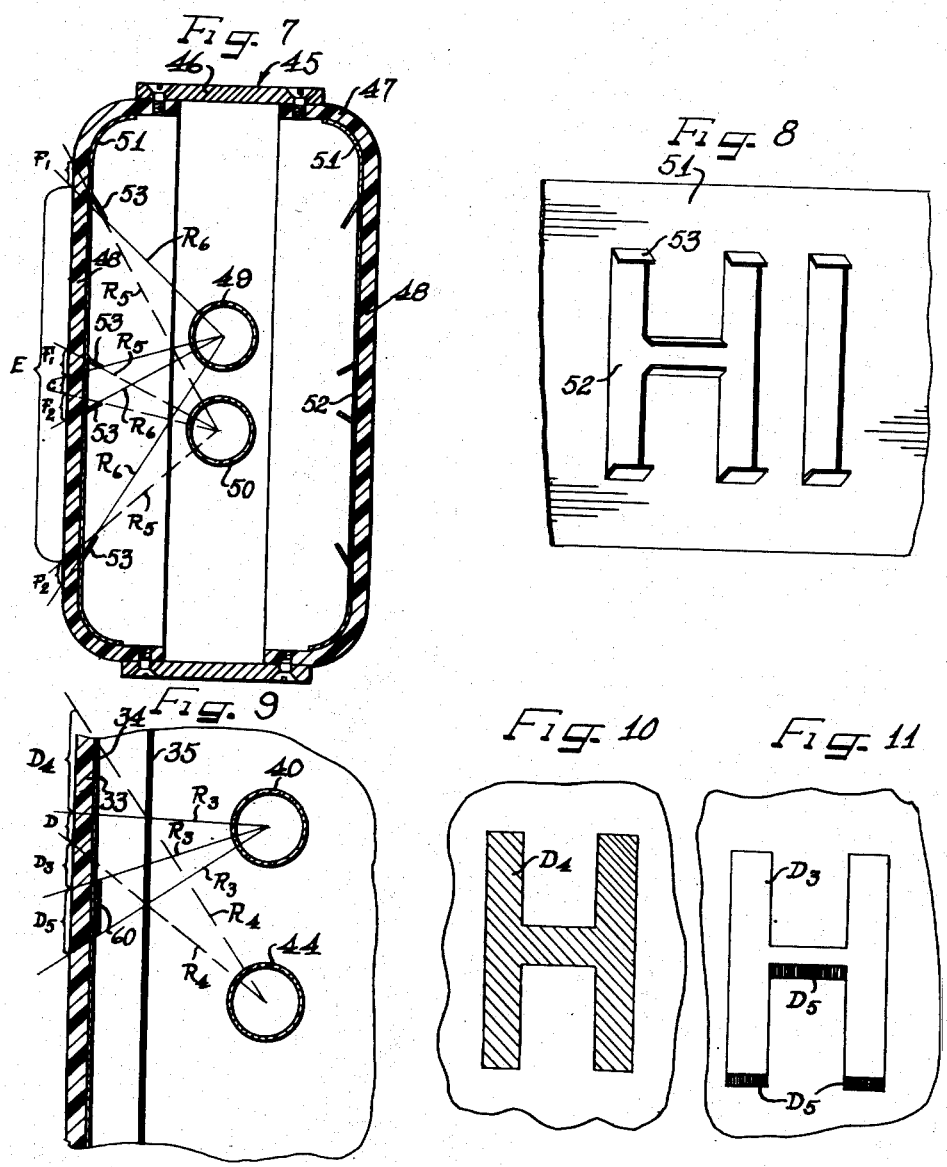
Inventor
Jean M. Hoff
by
Attys.

Patented Sept. 21, 1954

2,689,422

UNITED STATES PATENT OFFICE 2,689,422

ILLUMINATED DISPLAY

Jean M. Hoff, Evanston, Ill.

Application January 27, 1951, Serial No. 208,153

2 Claims. (Cl. 40—133)

The present invention relates to an illuminated display and more particularly to a display having a viewing surface for receiving light rays from a plurality of illumination sources, the rays from the sources being differently colored and passing through shielding means for yielding a variegated lighting effect.

The present invention now provides an extremely simple, inexpensive, illuminated display which requires no auxiliary source of power and which has no moving parts.

According to the present invention, a variegated lighting effect is obtained by the utilization of a plurality of individually and simultaneously energizable, preferably differently colored light sources spaced from one another and each disposed in spaced relation to a mask or shield having translucent portions defining indicia thereon for selectively transmitting light from the sources to a translucent viewing member.

Light rays from the sources pass through an appreciable distance before falling upon the viewing surface, so that a separation of the light rays from each of the sources is obtained and marginal portions of the indicia are defined in a variety of colors according to the differently colored light rays eminating from the sources. In other words, the plurality of spaced light sources define the indicia of the mask at the viewing surface, the indicia having marginal portions bearing the coloration of that source so disposed with relation to the mask that the light from the source is transmitted to the indicia margins, while light from the remainder of the sources is prevented from illuminating the same marginal portions of the indicia by the mask opaque portions lying between the remainder of the light sources and the viewing surface.

Preferably, a translucent diffusion member is utilized in conjunction with the viewing member to better conceal the interior sign mechanism and the mask and to give a "softened" appearance through the illumination of the sign. Various types of opaque masks may be utilized, so long as the mask is spaced from both the light sources and the viewing surface, and the light sources may be spaced either transversely of the viewing surface or in alignment therewith.

It is, therefore, an important object of the present invention to provide an improved illuminated display having no moving parts and requiring no auxiliary source of power for yielding a variegated lighting effect.

Another object of the present invention is to provide an improved illuminated display which provides a novel marginal lighting effect on a viewing surface.

Other and further important objects of this invention will be apparent from the disclosures in the specification and the accompanying drawings.

On the drawings:

Figure 1 is a front elevational view of an illuminated display of the present invention;

Figure 2 is a rear elevational view with the display rear cover removed to expose the display interior;

Figure 3 is an enlarged vertical sectional view taken along the plane III—III of Figure 1;

Figure 4 is an enlarged sectional view similar to Figure 3 illustrating a modified form of the present invention;

Figure 5 is a vertical sectional view similar to Figures 3 and 4 of a differently modified form of illuminated display of the present invention;

Figure 6 is a broken horizontal sectional view of that embodiment of the invention illustrated in Figure 5;

Figure 7 is a vertical sectional view similar to Figure 5 illustrating another modified form of illuminated display of the present invention;

Figure 8 is a fragmentary perspective view of a mask utilized in conjunction with the embodiment of the invention illustrated in Figure 7;

Figure 9 is a fragmentary vertical sectional view of still another modified form of illumination device of the present invention;

Figure 10 is a fragmentary elevational view of the indicia pattern formed on the viewing surface of the embodiment of Figure 9; and Figure 11 is a view similar to Figure 10 illustrating the indicia pattern of the embodiment of Figure 10 as illuminated during operation of this embodiment.

In Figure 1, reference numeral 15 refers generally to an illuminated display of the present invention, including a casing defined by a lower wall 16, a rear wall 17 mounted on and secured to the lower wall 16, an upper wall 18 secured to and superimposed upon a rear wall 17, and end walls 24. The walls 16—18 and 24 may be formed of any desired structural material such as wood, metal, plastic material, pressed wood fibers, or the like.

A front wall 19 of the casing is defined by a translucent and preferably transparent material such as glass, transparent plastic, such as methyl methacrylate or the like, or any other desirable translucent material. A diffusion surface 20 is provided by a piece of tightly woven cloth in surface contact with the exposed surface of the front wall 19, the cloth having edge portions 21 which are interposed between the front wall 19, the lower wall 16, and the upper wall 15, and the cloth being secured therebetween by the means securing the front wall to the upper and lower walls of the casing. It will be seen that the walls 16–19, inclusive, define an interior space A which is light-tight, with the inner surfaces of the walls 16, 17, 18 and 24 preferably being coated with a light absorbent paint or similar material for a purpose to be hereinafter more fully described.

The front wall 19 carries a mask 22 formed of opaque material such as an adherent paint, electro-deposited metal, a cardboard stencil, or other suitable opaque material provided with a plurality of apertures 23 providing the outline of an indicia pattern or the like. More particularly, the cooperating apertures 23 in the opaque mask 22 provides stencil-like cutouts which cooperatively define a word, reference character, or other indicia, such as the word "Ohio" as shown in Figures 1 and 2.

The ends of the space A are closed by end walls 24 which contact each of the walls 16–19, so as to complete formation of the light-tight-space A, and one of the walls 24 carries a plurality of light sockets 25 secured thereto by suitable means, as by screws 26 (Figure 2). Two such light sockets 25 are illustrated in Figure 2, but it will be appreciated that any number of light sockets may be so disposed upon one of the walls 24 for connection to a suitable source of electricity (not shown).

The sockets 25 each received a thermal flasher unit 27 inserted therein, such flasher units being well known to those skilled in the art and having the property of alternately establishing and interrupting the flow of electric current therethrough. Elongated incandescent light tubes 28 are threadedly retained by the thermal flasher units 27 for extension longitudinally within the space A in spaced parallel relation to the front wall 19, the tubes 28 constituting sources of light rays and being preferably capable of emitting differently colored light rays for transmission through the front wall or viewing member 19.

Due to the operation of the thermal-flasher unit 27, the de-energization of the tubes 28 will occur at random, with the light sources 28 being simultaneously energized during the same period of time in some instances and in other instances being alternately energized in accordance with the random operation of the thermal units. This random operation of the thermal units 27 is advantageous in the operation of the present invention, as will be hereinafter more fully described, inasmuch as a variegated lighting effect is obtained thereby, with the pattern of visible indicia viewable from the exterior of the space A being constantly varying.

The operation of the device of Figures 1–3, will be readily apparent from an inspection of Figure 3 in which it will be seen that light rays from the sources 28 and 29 are directed toward the translucent front wall 19 of the casing for passage therethrough to become visible at the diffusion surface 20 provided by the front wall covering. However, it will be seen that the passage of light through the front wall 19 is partially blocked by the mask 22 covering the inner surface of the front wall, so that only those non-masked portions of the front wall are capable of transmitting light rays from the sources 28–29. Inasmuch as the non-masked portions of the front wall 19 define the indicia thereon, it will be appreciated that these indicia will be rendered visible through the translucent front wall and that the indicia will be viewed at the translucent diffusion surface 20 which is exposed at the outer surface of the translucent wall 19. Thus, the indicia will appear in the area indicated by reference character C and enclosed within the corresponding bracket in Figure 3.

However, it will be noted that the light sources 28 and 29 are vertically offset from one another and that light rays $R_1$ from the source 28 will be transmitted through the translucent wall 19 throughout the entire vertical dimension C and also through an additional vertical dimension $C_1$ at the lower regions of the diffusion surface 20. Due to the angular displacement of the source 28 with respect to the lower regions of the mask 22, light rays $R_1$ will be transmitted through the mask at such an angle that the total area illuminated by the source 28 will include the area $C_1$. It will also be seen that the source 29 is vertically placed relatively closer to the bottom of the mask than the source 28 so that light rays $R_2$ from the source 29 will not pass downwardly and outwardly beyond the mask at the same angle as the light rays $R_1$ from the source 28. Thus, portion $C_1$ of the diffusion surface 20 will be illuminated solely by the light source 28.

It will also be seen that at the upper regions of the diffusion surface 20, an additional area $C_2$ will be illuminated solely by the light source 29 due to the relative angular displacement of this light source with respect to the upper regions of the mask, and the corresponding angular displacement of the light source 28 with respect to the same portions of the mask.

Thus, assuming that the light source 28 emits rays $R_1$ bearing a yellow coloration, while the light source 29 emits light of a blue coloration, the area C of the diffusion surface 20 will be illuminated with white light obtained by mingling of the light rays $R_1$ and $R_2$, the area $C_1$ will be illuminated only by the yellow colorations of the rays $R_1$ and the area $C_2$ will be illuminated only by the blue coloration of the rays $R_2$. In this manner, the vertical edges of the indicia 23 formed in the mask will be of a coloration different from that of the primary body of the indicia 23, and this marginal lighting of a different coloration will give a pleasing and unusual effect by the utilization of only two light sources.

In addition, the thermal flasher units 27 will alternately and simultaneously energize the light sources 28 and 29 at random so that during some periods of time both of the areas $C_1$ and $C_2$ will be visible, at different periods of time, only the areas C and $C_1$ will be visible, when the light source 28 is illuminated and the light source 29 is not energized. Similarly, at other times, the areas C and $C_2$ will be illuminated, as when the light source 29 is energized and the light source 28 is non-energized.

In this manner, a flickering, apparently moving indicia coloration is obtained at the diffusion surface 20 and a pleasing and unusual variegated lighting effect will be obtained. It will be appreciated that the extent of the area $C_1$ and $C_2$ may be varied by varying the distance between the viewing surface, that is the translucent surface 22, or alternatively, by varying the distance of the mask 22 from the light sources 28 and 29. Also various color combinations may be obtained by changing the coloration of the rays $R_1$ and $R_2$ emitted by the light sources 28 and 29, respectively, and if desired, a thermal flasher 27 may be utilized with only one of the light sources 28–29, so that a steady coloration of a constantly energized light source may be utilized and combined with an intermittently energized other light source.

That embodiment of the invention illustrated in Figure 4 is substantially identical with the embodiment hereinbefore described in connection with Figures 1–3, inclusive. In Figure 4, the same reference characters indicate identical portions of the apparatus 15, and it will be noted that the only material change is the utilization of light sources 28 and 29 which are aligned in a plane substantially normal to the plane of the viewing surface 20 rather than aligned parallel with the surface as illustrated in Figure 3. Substantially the same lighting effect is obtained by utilization of alternately and simultaneously energized light sources 28 and 29 to emit rays $R_1$ and $R_2$ of differing coloration.

However, it will be appreciated that both the upper and marginal portions $C_1$ and $C_2$ are of the same coloration in the embodiment of Figure 4, namely the coloration of the rays $R_2$.

In the embodiment of the invention illustrated in Figure 6, a casing 30 is defined by a peripheral or enclosing rigid band 31 formed of metal or the like rigid structural material and completely encircling the translucent viewing members 32 formed of a desirable translucent or transparent material such as glass or methyl methacrylate or similar plastic material. The members 32 are generally rectangular in form and are provided with integral inwardly dished marginal flanges 33 which are received within the circumference of the encircling band and which are securely clamped therein by suitable means. Such signs are well known and are generally described in U. S. Patent No. 2,505,673.

The members 33 carry on their inner surfaces and in conforming contact therewith a diffusion surface 34 formed of suitable material, such as closely woven fabric, parchment paper, or the like, such as that hereinbefore described in connection with the diffusion surface 20, and this surface covers substantially the entire inner dimension of the members 32 to define a smooth, uniform diffusion medium. Between the opposing flanges 33 of each of the members 32, there is confined a rigid mask 35 formed of metal, cardboard, wood or similar material having cutout areas 36 defined therein. Of course, the mask 35 is formed of an opaque material and is provided with marginal flanges 37 for securing the same to the inner surfaces of the members 32 or more particularly to a diffusion surface 34 carried thereby. The areas 36 may be either cut out from the opaque mask material or may be in the form of transparent or translucent panels which define reference indicia such as the word "Ohio" hereinbefore described in connection with the embodiment of Figures 1–3.

The encircling rigidifying member 31 carries a plurality of aligned electrical outlet sockets 38, such as the sockets 27 hereinbefore disclosed, one or all of the sockets threadedly receiving therein thermal flasher units 39 such as the units 27 hereinbefore disclosed, and the flasher units carry incandescent bulbs or similar sources of light 40 and 41 similar to the sources 28–29 hereinbefore described.

It will be seen that in this instance, light rays $R_3$ from the sources 40 are free to pass through the openings or panels 36 in the opaque mask 35 for transmission through the diffusion surface 34 and the viewing surface 32 to be visible at the surface 32, while light rays $R_4$ from the source 41 are similarly visible at the surface 32. Light rays from the sources 40–41 overlap in the area D so that when both sources are energized, the coloration of the light in the area D is due to a mingling of the coloration of the sources. A lower area of the viewing surface 32, as at $D_3$ is illuminated solely by the source 40, so that this area partakes the coloration of the source 40, while a similar area $D_4$ in the upper reaches of the member 32 is illuminated only by the source 41. Thus, a marginal lighting effect similar to that obtained in the embodiment of Figures 1–3 hereinbefore disclosed, will also be obtained by the utilization of that form of the invention illustrated in Figures 5 and 6. Here again, the marginal illumination of varying coloration is due to the sources 40–41 of different colors and the spacing of the mask opaque portions interposed between the surface 32 and sources 40–41.

In that embodiment of the invention illustrated in Figures 7 and 8, still another type of sign is illustrated which is similar in function to those hereinbefore described. Generally, a display 45 is defined by an encircling rigidifying band 46 which encloses marginal flange portions 47 of oppositely dished viewing members 48. Light soures 49 and 50 are vertically disposed within the casing, and a mask 51 is secured to the inner surface of the members 48 to follow the contour thereof and in smooth surface contact therewith.

The masks 51 are best illustrated in Figure 8, and it will be seen that the masks are provided with cutout portions providing indicia 52, the indicia being capable of transmitting light from the sources 49–50 to the viewing members 48 to be visible at the viewing surface, namely, the exterior surface of the members 48. The indicia 52, as hereinbefore explained, is provided by cut-away portions of the mask 51, and each of the vertical extremities of the indicia 52 is defined by flanges 53 either formed integrally with the mask 51 or secured thereto to extend inwardly at an acute angle toward the light sources 49–50.

As illustrated in Figure 7 the extreme upper flanges 53 are aligned with the center of the light source 50 so that rays $R_5$ from the light source 50 may pass under the flange 53 without material interference therewith for transmission through the transparent viewing member 48 to be visible at the outer viewing surface of the member 48. Similarly, it will be seen that light rays $R_6$ from the light source 49 will be at least partially blocked by the flange 53, so that rays cannot pass therebeneath, and an area $F_1$ is provided which receives only the rays $R_5$ and so has the coloration of the light source 50. The lowermost of the flanges 53 is aligned with the center of the source 49, so that light from the source 49 may pass beneath the lowermost flange 53 without substantial hindrance. On the other hand, light rays $R_5$ of the source 50 are blocked by the lower flange 53 so that a lower area $F_2$ is provided at which only the coloration of the source 50 is visible.

Intermediate the areas $F_1$ and $F_2$, an area C is provided at which the rays $R_5$ and $R_6$ intermingle so that this area bears a coloration which results from a mingling of the rays $R_5$ and $R_6$.

With respect to the intermediate flanges 53, it will be seen that the upper intermediate flange 53 is aligned with the source 50 to receive thereunder the rays $R_5$ while blocking the rays $R_6$ from the source 49, so that an additional area $F_1$ is formed having the coloration of the rays $R_5$. Similarly, a lower area $F_2$ is provided having the coloration of the rays $R_6$ and an intermediate area C is provided which has a coloration resulting from the mingling of the rays $R_5$ and $R_6$.

It will thus be seen that the flanges 53 provide a light blocking surface which permits the passage of light only from that source aligned with the flange, and a differential passage of light is obtained in much the same manner as by means of the cooperation of the masks 22 and 35 hereinbefore disclosed in conjunction with the light sources 28–29 and 40–41, respectively.

In connection with the embodiment of Figures 9–11, this form of the invention is similar to that form illustrated in Figures 5–6, and identical reference characters indicate identical portions of the apparatus. Here again, it will be seen that the sources 40 and 41 emit light rays $R_3$ and $R_4$, and that these rays, in cooperation with the viewing member 33 and the mask 35, the viewing member 33 and the diffusion surface 34 define the outer surface of the viewing member and area $D_4$ having the coloration of the rays $R_4$, and area D having the coloration of a mingling of the rays $R_3$ and $R_4$, and an area $D_3$ having the coloration of the rays $R_3$.

However, in a portion of that area defined by the rays $R_3$, an additional color filter 60 is provided in extended surface contact with the inner surface of the diffusion surface 34, and a corresponding area $D_5$ will have the coloration of the color filter 60.

The effect of the introduction of this colored filter 60 into the apparatus will be appreciated by a study of the indicia illustrated in Figures 10 and 11. In Figure 10, the indicia has a coloration $D_4$ resulting from the commingling of the rays $R_3$ and $R_4$. This coloration would result when only the light source 44 is energized, the rays $R_4$ from this light source having a blue coloration. When the light source 44 is not energized, and the source 40 is energized, the majority of the outline of the indicia will have the coloration $D_3$ of the rays $R_3$, while those portions of the indicia illustrated by the passage of the rays $R_3$ through the filter 60 will have the coloration $D_5$. For example, if the source 40 gives off rays $R_3$ which are of the yellow color, and the filter 60 passes only the red rays of the rays $R_3$ of the yellow coloration, then the areas $D_5$ will have a red coloration. Of course, if both of the sources 40 and 44 are energized simultaneously, the indicia will be colored over a majority of its surfaces of a white coloration, the area $D_4$ will be a blue color, the area $D_3$ will be white, and the area $D_5$ will be red. Obviously, the rays from both the sources 40 and 44 may be white, and the only different color observable will be the red coloration passed by the red or otherwise colored filter 60.

In certain of the embodiments hereinbefore disclosed, a translucent diffusion surface has been provided in order to soften the illumination obtained from the light source, but it will be appreciated that such a diffusion surface is not necessary, but serves merely to heighten the variegated effect obtained by an operation of the devices of the present invention. Much the same effect can be obtained by utilizing a "cloudy" or diffusion-type translucent viewing member.

It is highly desirable that the mask be spaced both from the viewing surface and from the sources so that the different angular relationships of the sources with respect to the mask and the viewing surface may permit the spreading which is necessary for the variegated marginal lighting effect. This spacing of the mask from the viewing surface will be readily appreciated in the embodiments of Figures 1–6 and 9–11 of the present invention. With respect to the embodiments of Figures 7 and 8, it will be appreciated that the viewing surface is actually the outer surface of the viewing members 49 so that the thickness of the viewing member serves to space the mask from the viewing surface, thereby accommodating the spreading of the light rays and the differential passage of the rays by the mask due to the different angular relation of the sources with respect to the mask flanges.

It will be understood that modifications and variations may be effected without departing from the scope of the novel concepts of the present invention.

I claim as my invention:

1. An illuminated display comprising a generally planar viewing member, a generally planar partially opaque mask extending generally parallel to and spaced from said viewing member and having indicia bearing portions extending therealong, a plurality of stationary linear sources of light rays extending in substantially parallel relation to each other and the full width of said indicia bearing portions and generally parallel to said indicia bearing portions of said mask, each of said linear light sources substantially uniformly illuminating said indicia bearing portions but being spaced from other of said linear light sources so as to produce a parallax effect relative to said indicia bearing portions, means associated with said light sources for effectively rendering said light sources of different colors to produce a uniform multi-color effect over the length of the indicia projected onto said viewing member, and means for intermittently operating at least one of said light sources, the indicia bearing portions in conjunction with said mask and said light sources producing on said viewing member first a one color flat appearance and then a multi-colored three-dimensional appearance as said one light source is intermittently operated.

2. An illuminated display comprising a pair of spaced generally planar viewing members, a generally planar partially opaque mask for each of said members extending generally parallel to and spaced from each of said viewing members and having indicia bearing portions extending therealong, said masks being positioned between said members, a plurality of stationary linear sources of light rays between said masks extending in substantially parallel relation to each other and generally parallel to said indicia bearing portions of each mask, each of said linear light sources substantially uniformly illuminating each said indicia bearing portions but being spaced from other of said linear light sources so as to produce a parallax effect relative to each said indicia bearing portions, means associated with said light sources for effectively rendering said light sources of different colors to produce a uniform multi-color effect over the length of the indicia projected onto said viewing members, and means for intermittently operating at least one of said light sources, the indicia bearing portions in conjunction with the mask associated therewith and said light sources producing on the viewing member associated with the mask first a one color flat appearance and then a multi-colored three-dimensional appearance as said one light source is intermittently operated.

References Cited in the file of this patent

UNITED STATES PATENTS

| Number | Name | Date |
| --- | --- | --- |
| 1,095,321 | Fisk | May 5, 1914 |
| 1,129,092 | Hay | Feb. 23, 1915 |
| 1,794,886 | Durham | Mar. 3, 1931 |
| 1,828,177 | Curtiss | Oct. 20, 1931 |
| 1,931,577 | Easterday | Oct. 24, 1933 |
| 2,030,886 | McDonald | Feb. 18, 1936 |
| 2,041,189 | Keating | May 19, 1936 |